Patented Jan. 5, 1954

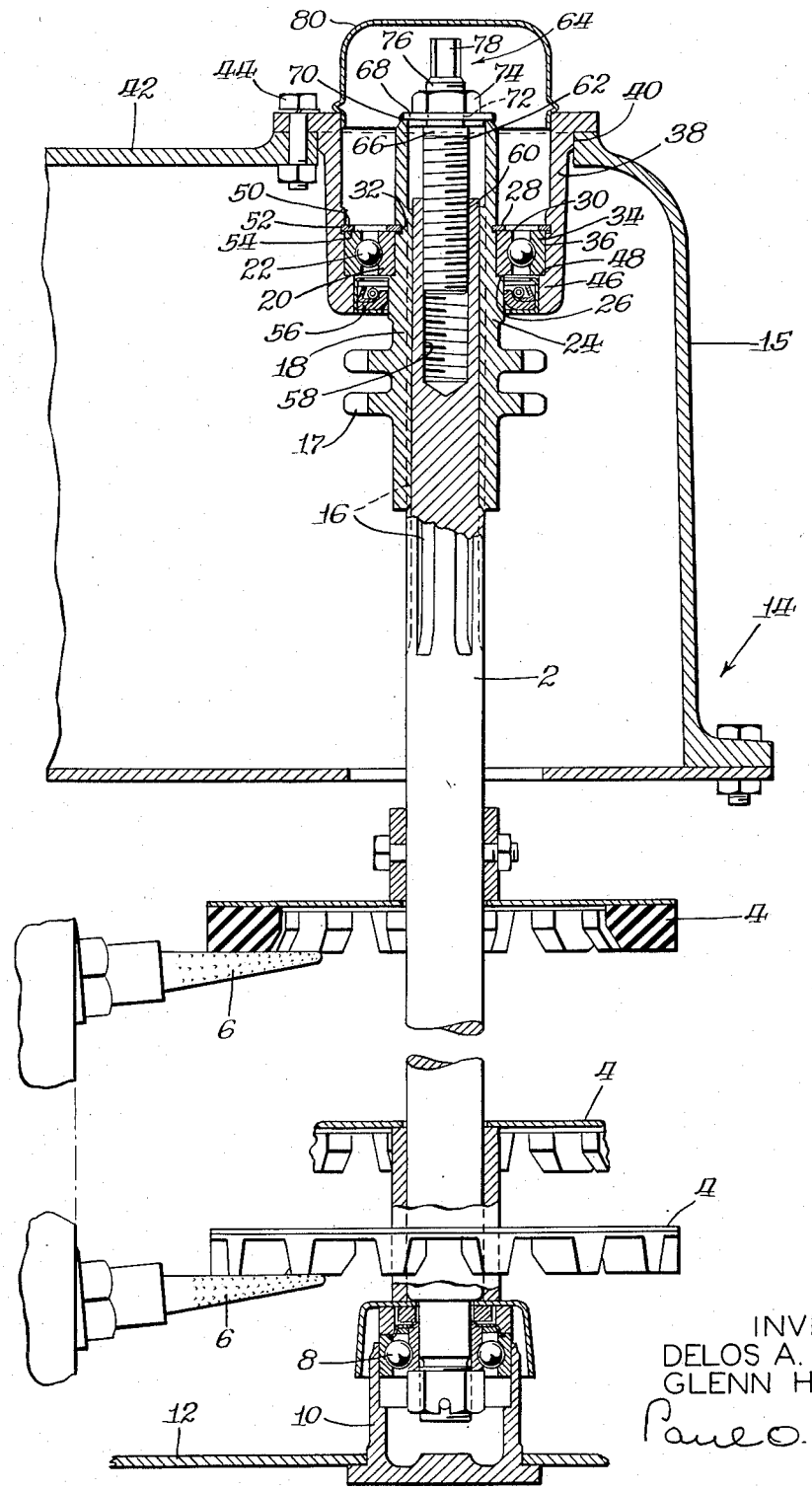

2,664,689

UNITED STATES PATENT OFFICE 2,664,689

COTTON PICKER DOFFER MECHANISM ADJUSTING MEANS

Delos A. Walker and Glenn H. Gross, Memphis, Tenn., assignors to International Harvester Company, a corporation of New Jersey Application May 5, 1951, Serial No. 224,774

1 Claim. (Cl. 56—41)

This invention relates to cotton pickers of the type shown in E. A. Johnston U. S. Patent 2,140,651 and more specifically to a novel adjusting means for the doffer mechanism thereof.

A general object of the invention is to provide a novel, simple and effective adjustment for positioning the doffing means with respect to the associated picking spindles.

A more specific object is to devise an adjusting means which positively holds the doffer assembly against axial or endwise movement in either direction.

A further object is to design an adjusting arrangement wherein all of the operating parts are enclosed and fully protected against dirt and the like to prevent malfunctioning and rapid wear of the device.

A still further object is to provide an adjusting mechanism which will fit readily within existing limitations.

The invention also contemplates the provisions of a device which has heavy, rugged and durable parts.

A different object of the invention is to devise an adjusting mechanism which provides an extensive range of adjustment.

Another object is to arrange the parts of the adjusting mechanism in such manner that the areas subject to most wear may be reconditioned at small cost by replacing minor parts.

These and other objects of the invention will become more apparent from the following, wherein:

The drawing fragmentarily illustrates a doffing assembly and associated parts of a cotton picker, certain of the elements of the doffing assembly being shown in vertical cross-section.

Describing the invention in detail, the doffer mechanism is in general the same as that shown in the beforementioned patent and comprises an upright supporting and driving shaft 2 carrying a plurality of doffer elements 4. The doffer elements cooperate with picking spindles or members 6 as explained in the patent and the application. The lower end of the shaft may be rotatably mounted within a bearing assembly 8 which has a slidable fit within a bearing cup 10 so as to permit vertical movements of the shaft for adjusting the doffer mechanism.

The cup 10 is mounted on a lower plate member 12 of a housing 14 which is provided with a head 15 at its upper extremity and into which the upper end of the shaft 2 extends. The cup 10 and associated bearing 8 and member 12 of housing 14 constitute a support for the lower end of the shaft.

The upper part of shaft 2 has a splined connection as at 16 with a driving member in the form of a sprocket 17 sleeved thereon, the sprocket having an axial upwardly extending portion in the form of a sleeve or collar 18 snugly fitting through an inner race 20 of an axial thrust bearing assembly 22. The collar 18 has, below bearing assembly 22, an outer radial flange 24 providing on its top side a shoulder 26 affording a seat for the lower edge of race 20 of bearing 22, said race 20 being locked against shoulder 26 by a radially contracting snap ring 28 bearing against the top edge 30 of race 20 and releasably entered into a groove 32 in the outer periphery of collar 18.

The bearing assembly 22 has an outer race 34 which fits into a complementary bore 36 in a bearing cup 38 nested within an opening 40 in the top member 42 of the head 15 of the housing. Cup 38 may be secured to member 42 as by bolt and nut assemblies 44.

The race 34 is held in cup 38 by an inturned flange 46 at the lower edge of cup 38, the race 34 seating on its lower edge on the top side of flange 46 as at 48. A radially expanding snap ring 50, fitted into an internal slot 52 in the cup 38, seats against the top edge 54 of race 34. A seal 56 is provided for bearing assembly 22 in usual manner. The bearing and associated retaining parts constitute a supporting rotatable connection or mounting between the shaft or the sleeve of gear 17 and the support structure including the cup 38 and the head of the housing 14.

The upper end of shaft 2 has an axial bore 58 open through the top end of the shaft. The bore 58 has threaded engagement as at 60 with a lower threaded shank 62 of an axially arranged screw or adjusting element means 64. The upper end of shank 62 terminates in an abutment or upwardly facing area defining shoulder 66 which is adapted to engage and bear or abut against the underside of a washer or closure member 68 which has a lower portion snugly fitted into the upper end of collar 18 and an upper peripheral portion overlapping the upper edge of collar 18 and welded or otherwise secured as at 70 thereto. The member 68 and collar 18 are thus integral and for all intents and purposes constitute an enclosure for the upper end of the shaft. The screw is reduced in cross-section above the shoulder and extends loosely through an axial opening 72 in the washer 68. A setting nut or adjustable abutment 74 is threaded on the reduced portion 76 of the screw and seats against the top side of the washer 68. The screw is further reduced in diameter at its upper extremity to provide a non-round preferably hexagonal wrench engaging section 78.

In operation, to adjust the vertical position of the doffer assembly, the dust cap 80 is removed from the upper end of cup 38. The portion 78 is held in a wrench and nut 74 is rotated to loosen the clamping action thereof with shoulder 66 against opposite sides of washer 68. Then nut 74 is released and the screw 64 which is thus rotatably mounted from member 17, is rotated by wrench at section 78 in either direction to adjust the position of the shaft and thus the doffer elements carried thereby. Then while holding at section 78, the nut is tightened to clamp washer 68 between the nut and the shoulder 66. The washer limits upward movement of the screw 64 and thus forms a convenient gauge for setting the doffer mechanism in lowermost position. By maintaining the screw parts clean as provided by this structure the screw turns easily and turning beyond adjusted position, such as would be possible if the screw turned hard, is avoided due to the high sensitivity of the device. Washer 68 also serves as a stop for the upper end face of the shaft when the same is fully retracted into the sleeve 18.

What is claimed is:

In a cotton picker doffer assembly including a substantially vertical shaft, a sprocket sleeved thereon adjacent to the upper end thereof and having a splined connection therewith, whereby the shaft and sprocket are relatively axially movable, said sprocket having an integral upwardly extending sleeve encompassing the upper end of the shaft and projecting thereabove and having an upper edge, an end thrust bearing about said sleeve and connected thereto intermediate its ends, a support having a bore, said bearing disposed within said bore and connected to said support, a screw threaded into the upper end of said shaft and coaxial therewith and having a shoulder intermediate its ends with an upwardly facing abutment surface, a washer having top and bottom sides and said bottom side seated peripherally upon said upper edge of said sleeve and connected thereto, said washer having an opening admitting said screw therethrough and having a downwardly facing surface on its bottom side disposed in opposing relationship to said upwardly facing abutment surface on said screw and a setting nut threaded on the screw and bearing against the top side of said washer while drawing said shoulder of said screw against the bottom side of the washer whereby said screw and said sprocket are interlocked in set position, said shaft having an upwardly facing end face on its upper end facing said bottom side surface on said washer and abuttable therewith for limiting upward movement of said shaft.

DELOS A. WALKER.
GLENN H. GROSS.

References Cited in the file of this patent

UNITED STATES PATENTS

| Number | Name | Date |
| --- | --- | --- |
| 1,801,996 | Benjamin | Apr. 21, 1931 |
| 2,140,631 | Johnston | Dec. 20, 1938 |